United States Patent
McCloskey et al.

(10) Patent No.: US 8,667,239 B1
(45) Date of Patent: *Mar. 4, 2014

(54) ASSISTED MAINFRAME DATA DE-DUPLICATION

(75) Inventors: Larry McCloskey, Burlington, MA (US); Bruce F. Offhaus, Waldoboro, ME (US); Thomas McCafferty, Peabody, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,611

(22) Filed: Sep. 11, 2012

Related U.S. Application Data (63) Continuation of application No. 12/688,018, filed on Jan. 15, 2010, now Pat. No. 8,291,183.

(60) Provisional application No. 61/144,838, filed on Jan. 15, 2009.

(51) Int. Cl.
*G06F 7/04* (2006.01)
*G06F 7/32* (2006.01)

(52) U.S. Cl.
USPC ..... 711/162; 711/112; 711/216; 711/E12.019

(58) Field of Classification Search
USPC ........... 711/112, 162, 216, E12.015, E12.109
See application file for complete search history.

(56) References Cited

U.S. PATENT DOCUMENTS

| | | | |
|---|---|---|---|
| 7,640,262 B1 | 12/2009 | Beaverson | |
| 7,664,791 B1 | 2/2010 | Hamilton | |
| 7,720,892 B1 | 5/2010 | Healey, Jr. | |
| 7,797,279 B1 | 9/2010 | Starling | |
| 7,853,750 B2 | 12/2010 | Stager | |
| 7,908,436 B1 | 3/2011 | Srinivasan | |
| 7,921,077 B2 | 4/2011 | Ting | |
| 7,930,559 B1 | 4/2011 | Beaverson | |
| 7,979,670 B2 | 7/2011 | Saliba | |
| 7,996,371 B1 | 8/2011 | Deshmukh | |
| 8,291,183 B2 | 10/2012 | McCloskey | |
| 2007/0061530 A1* | 3/2007 | Bourhis et al. | 711/162 |

(Continued)

FOREIGN PATENT DOCUMENTS

| | | |
|---|---|---|
| WO | WO 2009/006278 A1 | 1/2009 |
| WO | WO 2009/091957 A2 | 7/2009 |

(Continued)

*Primary Examiner* — Hal Schnee
(74) *Attorney, Agent, or Firm* — Hamilton, Brook, Smith & Reynolds, P.C.

(57) ABSTRACT

Data de-duplication ("de-dupe") allows IT organizations to replace aging tape systems with disk-based backup solutions and minimize the storage allocated to backup and data protection. The effectiveness of de-dupe technology is dependent on the data being protected. Data streams with little data repetitiveness provide disappointing results when processed through a block-level de-dupe engine. To avoid this problem, Assisted Mainframe De-Dupe (AMDD) technology can insure that filesystem block-level de-dupe products efficiently de-dupe tape backup streams received from IBM™ and/or compatible mainframes. By pre-processing backup tape volumes before sending the data to storage, AMDD insures that large amounts of unchanged data lines up on de-dupe block boundaries each time the data is sent to the de-dupe process engine. By providing "well-behaved" data to the de-dupe process, AMDD can improve the effectiveness of de-dupe processing and substantially reduce the storage used to backup critical mainframe DASD resources.

18 Claims, 8 Drawing Sheets

(56) References Cited

U.S. PATENT DOCUMENTS

| | | |
|---|---|---|
| 2008/0016131 A1 | 1/2008 | Sandorfi |
| 2008/0243769 A1* | 10/2008 | Arbour et al. ............... 707/2 |
| 2009/0049260 A1* | 2/2009 | Upadhyayula ............ 711/162 |
| 2009/0063528 A1 | 3/2009 | Yueh |
| 2009/0063795 A1 | 3/2009 | Yueh |
| 2009/0171888 A1* | 7/2009 | Anglin ........................ 707/2 |
| 2009/0182789 A1 | 7/2009 | Sandorfi |
| 2009/0292746 A1 | 11/2009 | Bricker |
| 2010/0037118 A1* | 2/2010 | Saliba et al. ............... 714/752 |
| 2010/0042790 A1 | 2/2010 | Mondal |
| 2010/0049726 A1* | 2/2010 | Yasa et al. ................ 707/101 |
| 2010/0088296 A1 | 4/2010 | Periyagaram |
| 2010/0114833 A1 | 5/2010 | Mu |
| 2010/0125553 A1 | 5/2010 | Huang |
| 2010/0312800 A1 | 12/2010 | Lumb |
| 2010/0332452 A1 | 12/2010 | Hsu |
| 2011/0071980 A1 | 3/2011 | Patterson |
| 2011/0145523 A1 | 6/2011 | Gupta |
| 2011/0184921 A1 | 7/2011 | Reiter |
| 2011/0184966 A1 | 7/2011 | Reiter |
| 2011/0184967 A1 | 7/2011 | Reiter |
| 2011/0185133 A1 | 7/2011 | Reiter |

FOREIGN PATENT DOCUMENTS

| | | |
|---|---|---|
| WO | WO 2009/091957 A3 | 7/2009 |
| WO | WO 2009/102573 A1 | 8/2009 |
| WO | WO 2009/129161 A2 | 10/2009 |
| WO | WO 2009/129161 A3 | 10/2009 |
| WO | WO 2010/019596 A2 | 2/2010 |
| WO | WO 2011/091354 A2 | 7/2011 |

* cited by examiner

ASSISTED MAINFRAME DATA DE-DUPLICATION

RELATED APPLICATIONS

This application is a continuation of U.S. application Ser. No. 12/688,018, filed on Jan. 15, 2010 now U.S. Pat. No. 8,291,183, which claims the benefit of U.S. Provisional Application No. 61/144,838, filed on Jan. 15, 2009. The entire teachings of the above applications are incorporated herein by reference.

BACKGROUND OF THE INVENTION

The present invention relates to backup data storage, and more particularly to techniques for improving the performance of data de-duplication especially in mainframe environments.

Disk technologies, such as serial Advanced Technology Attachment (ATA), have continued to drive down the cost per megabyte of open-systems disk storage. And as the cost has declined, interest in using disk for backup in place of traditional tape has sky rocketed. As a result there are numerous vendors providing virtual tape and disk-to-disk backup solutions; particularly in the Storage Area Networking (SAN)/ fibre channel arena. As backup to disk has proliferated, so too has the concept of data de-duplication.

Data de-duplication (or "de-dupe" for short) is based on the idea that much of the data that is being backed up on a daily or weekly basis is repetitive. The classic example used to demonstrate this concept is an e-mail sent to 10 co-workers including a large spreadsheet. Assuming the e-mail server is backed up daily, the spreadsheet is copied to backup storage 10 times each night. If a week's worth of daily backups is kept 70 copies of the same spreadsheet are written onto the backup system.

Data de-duplication technology is intended to reduce or eliminate duplicate copies of data as it is being stored. In the example given, data de-duplication would ideally store the large spreadsheet once on the backup storage and replace the other 69 occurrences with a pointer to the original backed up copy of the data.

This spreadsheet example is a real-world example intended to help the reader understand the concept of data de-duplication. However, in practice, most commercial data de-duplication performs what can be referred to as filesystem, block-level data de-duplication. Rather than eliminate duplicate copies of entire files, as the spreadsheet example above would suggest, these products work at the block level. As data blocks are written to the filesystem, the de-dupe engine uses some technique (such as data hashing) to identify duplicate blocks of data and eliminate them; replacing the repetitive block with a pointer to the original copy of the data block.

The benefit of block level de-dupe, when compared to traditional data compression, is that it spans multiple blocks and files. Traditional data compression is done on a block by block basis. It scans the block looking for repetitive characters and compresses those repetitive characters in order to shorten the length of each block as it is written. But data compression processes one block at a time and no attempt is made to perform any sort of compression across multiple blocks of data or across multiple files within a filesystem. When applied to the example above, traditional compression thus shortens the size of all the copies of the spreadsheet being backed up, but it does not necessarily eliminate any of the copies; or even any repetitive blocks of data that may occur within a single copy.

If one backs up the same file 100 times using a data compression engine, the compression ratio will remain the same. If the first backup results in 3-to-1 compression, the 100th backup will also result in 3-to-1 compression (assuming the file did not change). The total data compression for the filesystem containing all 100 backups will thus be 3-to-1.

Filesystem level data de-dupe, on the other hand, generally improves in effectiveness each time the same data is written to the de-dupe engine even when compression is applied. The first time a file is written to a de-dupe engine the result may only be 2-to-1 de-duplication, as the de-dupe engine eliminates randomly duplicate blocks of data from within the file. If the file does not change at all, the second backup will result in a huge space savings as virtually all of the blocks in the file will already have been stored on the filesystem. So only the space required to build pointers will be taken. The third and subsequent copies should improve the effectiveness of the filesystem de-duplication even more.

But the caveat of data de-duplication is that the effectiveness of de-duplication is based on the repetitiveness of the data blocks being written to the filesystem. In theory, if the same data is written over and over again without ever changing it, the effectiveness of the de-dupe engine should near 100%. That is, additional copies of the data should take almost no additional storage space.

But as soon as the data starts to vary, the effectiveness of the de-dupe engine will drop off. And, if one merely inserts a character or two of data to the front of an otherwise unchanged file, the effectiveness of the de-dupe engine is likely to drop off substantially, as all the data shifts right by a couple of characters in each block. This has the effect of reducing the likelihood of duplicate blocks when compared to previous backups of the same file.

Data de-duplication vendors market a wide range of effectiveness claims. But usually these results will be highly qualified; defining very specifically under what circumstances these high de-duplication ratios were achieved. As the data sent to a de-duplication engine varies, so does the effectiveness of the de-dupe process.

Mainframe Data Library (MDL)

Large-scale mainframe computers are used extensively across all industries. Historically, tape storage has been used almost exclusively to provide permanent and temporary data protection services to those mainframes. In such environments, it is not uncommon for mainframe tape libraries to hold hundreds of terabytes (TB) of data spread across tens of thousands of tape volumes.

Figure 1:
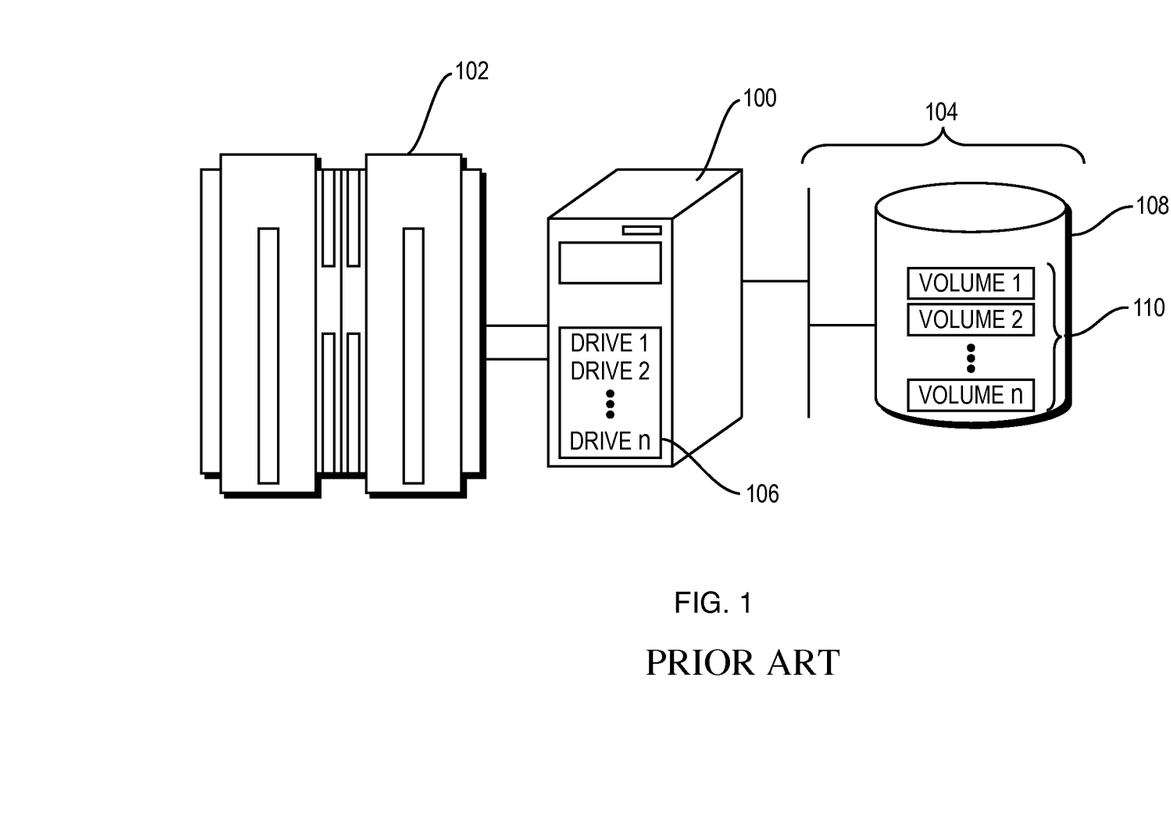
FIG. 1 is a high level diagram showing the interconnection between a mainframe computer, a Mainframe Data Library (MDL) device, and a disk storage sub-system.

A product such as the Mainframe Data Library (MDL) available from Bus-Tech™, Inc. of Burlington, Mass. is a virtual tape library for an IBM™ or compatible mainframe. As shown in FIG. 1, MDL is an input/output controller 100 that attaches between an IBM™ mainframe 102 and standard open-systems disk storage 104.

MDL emulates a given number of tape drives to the mainframe 102. As a mainframe-based application writes data to any of the MDL's drives 106, that data is stored as a tape volume image 110 on the backend disk system 104. Each individual tape volume image 110 (VOLSER) written by the mainframe 102 becomes a single disk file on the filesystem 108 on the open-systems disk 104.

MDL is ultimately providing a storage sub-system that allows mainframe data centers to move from a tape-based backup solution to a disk-based backup solution, leveraging today's high speed low cost disk technology to provide an innovative approach to data protection including both local and remote disaster recovery. And, given the large amount of data being stored, and the type of data being written, there is plenty of incentive to provide effective data de-duplication capabilities within the MDL solution set. The problem becomes how to successfully de-dupe mainframe tape volumes in this scenario.

SUMMARY OF THE INVENTION

The Problems with Existing Mainframe Data De-Dupe

The primary use of tape in providing data protection for mainframes is for backing up individual mainframe disks, known as Direct Access Storage Devices (DASD). Today's IBM™ mainframe operating systems all work with 3390 DASD volumes. Although the current marketing names of mainframe storage systems no longer use the 3390 nomenclature, almost all current DASD systems attached to IBM™ or compatible mainframes present the storage to the operating system as a collection of 3390 compatible volumes.

3390 storage volumes come in a number of models, most commonly including models 3, 9, 27, and 54; where the model number is roughly equivalent to the capacity in Gigabytes (GB) of the volume. That is, a 3390 mod 3 volume has a capacity of about 3 GBs of storage, a 3390 mod 9 volume has a capacity of about 9 GBs of storage, and so on. All mainframe DASD is defined to the mainframe using these 3390 models. So, even if a large mainframe has terabytes of disk space connected, that storage will be presented to the mainframe as a collection of 3390 volumes. Because 3390s were originally available primarily as models 3 and 9, many existing data centers configure their entire DASD system into mod 9 s and/or mod 3 s; holding just 9 GBs or 3 GBs per volume. The result is configurations that often involve hundreds or thousands of 3390 volumes.

Mainframe backup software for the most part is designed to backup DASD one volume at a time. A single execution of the backup program will dump (backup) one 3390 volume to one tape volume. The net result of this is that a mainframe with hundreds of 3390 volumes will have a tape library holding thousands of tape volumes, each one holding a copy of one of the 3390 volumes in the disk system.

It is not uncommon to find even medium sized mainframe installations with 30-40 tape drives configured within MDL. During a daily backup cycle those drives can be busy for hours at a time writing hundreds of new tape volume images in the tape library.

Mainframe DASD volumes dumped to MDL in the fashion described above do not necessarily lend themselves well to current data de-duplication techniques. The reason is that most backup software includes techniques to minimize the amount of data being written to a backup in order to reduce the amount of tape being used. These techniques often imply that even though the same mainframe DASD volumes are backed up over and over again, the backup images of any one volume vary enough from one backup to the next to disrupt the effectiveness of data de-duplication.

To illustrate this, consider an example backup of a mainframe system volume normally referred to as SYSRES. By definition, the SYSRES volume does not change much from one day to the next. The data on this volume includes things like the mainframe operating system which is almost never changed. At first glance, one might think that daily backup of the SYSRES volume would be highly repetitive and easily de-duped. But, unfortunately, that is only true if absolutely nothing on the volume changes. A single small change near the front of the volume could possibly disrupt the ability to efficiently de-dupe the backup image of the entire volume.

Backup software for mainframe 3390 volumes typically copies disk tracks. To reduce the amount of data being written to the tape, empty disk tracks are not copied. Tracks that are copied are compressed to remove unused areas of the track before the backup software writes the track to tape. Changing a single byte of data on a single track near the front of the volume can result in a change in the length of the compressed image of that track. This results in all of the data in the rest of the backup to shift its location a few bytes in one direction or the other. This data shift will disrupt the effectiveness of a de-dupe process which is dividing the data stream into blocks and then looking for duplicate blocks on the whole filesystem.

Testing has shown that even daily backup of very static mainframe disk volumes does not provide the kind of results one might hope for from a filesystem de-dupe engine. Specifically, repeated testing has shown results roughly equivalent to a 5-to-1 data compression. Compared with current block level hardware data compression, which may deliver 3-to-1 or 4-to-1 compression, filesystem level data de-dupe simply does not offer significant enough benefit to justify the cost of implementation.

To summarize, most commercially available de-dupe engines perform what is known as filesystem de-duplication where they look for duplicate data blocks across an entire filesystem and eliminate storage of the duplicates. And, while open-systems backups can provide reasonably good results when combined with these de-dupe engines, the effectiveness of these solutions is very much dependent on "well-behaved", static data. Data that continually changes does not lend itself to effective filesystem block de-duplication. Because of the way mainframe backup software works, even the slightest change in a 3390 volume can cause the data to shift left or right a few bytes causing the de-dupe engine to look at the entire volume backup as changed data.

The Solution-Assisted Mainframe Data De-Dupe

As previously discussed, the effectiveness of filesystem block-level data de-duplication is extremely sensitive to the data stream being written. While data de-duplication tends to improve over time (as more data gets written to the backstore), there is no guarantee that long term use of data de-duplication in a mainframe environment will substantially provide enough reduction in storage requirements to justify implementation.

But suppose, for a moment, that only "well-behaved" data could be sent to a de-dupe engine. That data sent would, by definition, be well suited to allow the identification of repetitive, duplicate blocks of data. That is, if a backup file only changed by a few bytes from one backup to the next, then the majority of the data could still be recognized as duplicate data by the de-dupe engine. Instead of achieving a 5-to-1 overall compression of data, the de-dupe engine could now be expected to produce the kinds of data reduction that well behaved data typically sees when run through a de-dupe process.

Assisted Mainframe Data De-dupe (AMDD) technology according to the present invention can provide these advantages. When coupled with AMDD, Mainframe Data Library (MDL) can be uniquely positioned to substantially reduce the amount of storage required to backup and protect mainframe 3390 DASD.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF A PREFERRED EMBODIMENT

A description of example embodiments of the invention follows.

Introduction

In today's IBM™ mainframe data center there are a select set of mainframe-based applications used to provide the bulk of all data backup and protection services. In the z/OS™ environment, examples of these applications include IBM's™ DSS™ and HSM™ and Innovation Data's FDR™. These identifiable applications are collectively responsible for an overwhelmingly high percentage of data written to mainframe tape devices.

Products such as Bus-Tech' S™ MDL use software-based tape emulation to replace physical tapes and tape drives with low-cost open systems disk storage. Each time a mainframe program writes a new tape volume to MDL, software running within MDL writes that data as a file on a standard filesystem. And, because many of the open-systems data de-duplication engines are capable of presenting themselves as a Network File System (NFS) server, those de-dupe engines can automatically receive data from MDL.

AMDD 200 technology builds upon proven mainframe I/O and tape emulation solutions. For example, AMDD 200 technology tightly integrates and enhances the tape-on-disk technology within MDL. This integration allows MDL to automatically sense whether or not a tape volume being received was created using one of the known, select backup applications.

Figure 2:
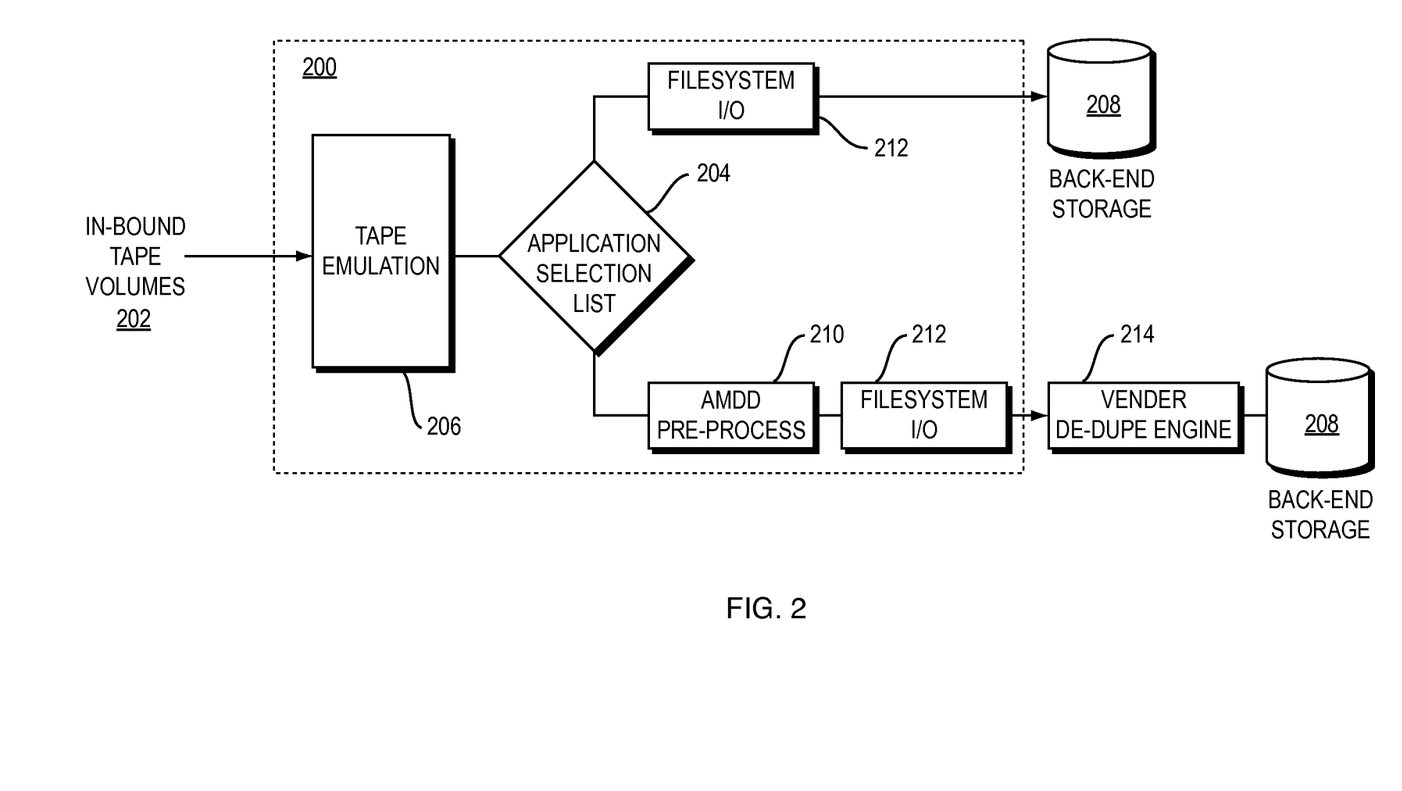
FIG. 2 is a more detailed view of the MDL.

As shown in the block diagram of FIG. 2, data 202 created by any application other than those on a selection list 204 will pass unchanged through the tape-on-disk application 206 and be written to a filesystem 212 on the back-end storage 208 without being modified by AMDD Pre-Process 210.

Data identified as being created by those applications on the selection list 204 will, however, be processed by an AMDD pre-process 210 to prepare them for data de-duplication. Once pre-processed, the data is written to an NFS share 212 supported by any vendor's De-Dupe engine 214 for processing. As a result of having been pre-processed by AMDD 200, data de-duplication performance is significantly higher than had the data not been pre-processed.

When the mainframe 102 attempts to mount the tape for input, the vendor specific de-dupe engine 214 re-inflates the tape volume data to the state in which it was originally received from the AMDD pre-process 210. The software within MDL 206 recognizes the inbound data stream 202 as an AMDD data stream and then post-processes the data back to the original form written by the mainframe 102. The mainframe 102 receives the data exactly as it would have had it been written to physical tape.

Tape Volume Detection

Different backup products use their own internal formats to backup/dump mainframe disks (DASD) to tape. Tape-on-disk software can inspect the first few blocks of data received for any new tape volume being created. Using advance knowledge of what the data should look like, MDL 200 can then quickly determine if the volume 202 being received is a candidate for AMDD pre-processing 210 or not. The overhead to detect a known backup application is minimal, and once a volume has been characterized, the remaining blocks of data will be either passed directly to filesystem I/O 214 or to the AMDD pre-process 210.

Details of the AMDD Pre-Process

The Assisted Mainframe Data De-dupe (AMDD) pre-process 210 is now described in more detail.

To understand how AMDD works, one first needs to understand how data is stored on mainframe DASD and how it is backed up to tape. While the actual data format of the tape is different based on the application used to do the backup, the general philosophy of how the data is backed up is virtually the same across all backup programs.

Figure 3:
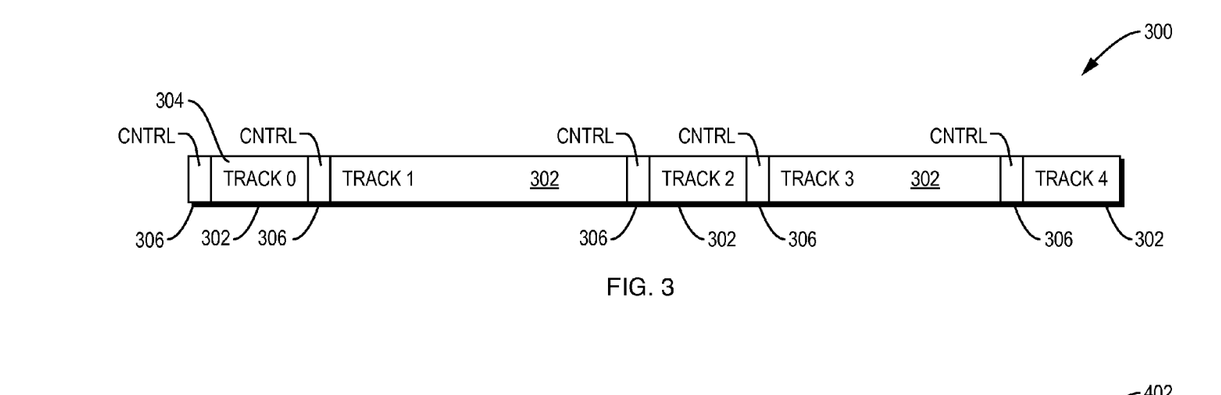
FIG. 3 is a typical mainframe backup data stream.

Mainframe DASD 300, like any other disk, is organized into tracks 302 with a track being one revolution of the disk. Backup applications that dump DASD volumes generally begin at track 0 (304), cylinder 0 and do a track-by-track sequential copy of the data to the output tape. As this track-by-track copy is being done, the backup utility typically automatically compresses (or not copy) unused areas on the track. So, for example, while a 3390 track is capable of storing 56,000 bytes of data, if a track only has 5,000 bytes of data written to it, only the 5,000 bytes of data will actually be written to the tape.

Control information 306, such as a block count, may be added to the data in front of each track 302, depending on the application doing the backup. The result is a tape data stream 300 that typically looks something like the picture shown in FIG. 3, with the amount of space used to backup any individual track dependent on how much data was actually found on the track 302.

Figure 4:
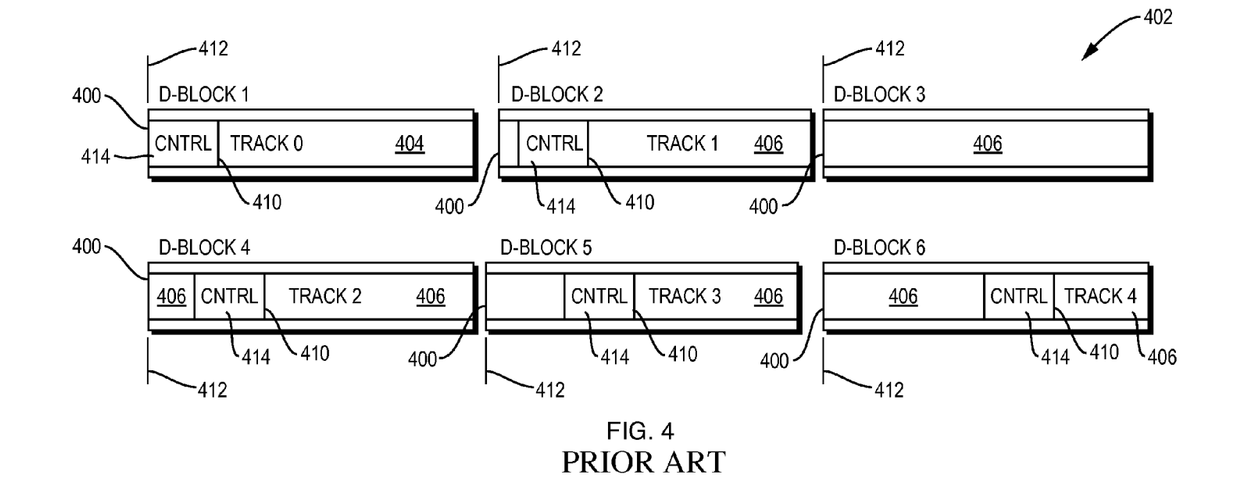
FIG. 4 is an example of backup data after it has been arranged into blocks by a typical de-dupe processing engine.

When the data stream 300 is sent to the de-duplication engine 214, the de-dupe engine 214 typically begins by breaking the data down into some fixed block size 400 that is optimal for the de-duplication process. A typical de-dupe block size may be 4,000 bytes (4 k), for example.

With varying track lengths and data that has already been compressed before being sent to the de-dupe engine, the resulting blocks processed by the de-dupe engine will look something like FIG. 4.

In this example, if the same tracks were not changed between backups, then the block layout 402 should stay the same and de-dupe should be able to recognize duplicate data blocks from one day to the next. But as soon as the length of the data on Track 0 (404), for example, changes, then all data in all subsequent blocks 406 gets shifted to the left or right and de-duplication becomes ineffective.

When AMDD 210 pre-processes a tape volume it attempts to minimize the impact a change in track contents or a change in the control information has on the resulting data stream when it gets divided up into blocks for de-duping. To accomplish this, AMDD 210 scans the data 300 and identifies the start 410 of each DASD track. It then pads 502 the data being sent to the de-dupe engine 214 so that each track begins at the start 412 of a new de-dupe block. Additionally, AMDD 200 separates control information 414 from the track data, so that simple block counts cannot disrupt the entire de-dupe process. A resulting pre-processed data stream 504 sent to the de-dupe engine 214 will look something like FIG. 5 once it is divided into blocks by the de-dupe engine 214.

Although pre-processing may slightly increase the size of the file being sent to the de-dupe engine, the data will now be extremely well suited for de-dupe as multiple backups of the same disk are processed.

Figure 5:
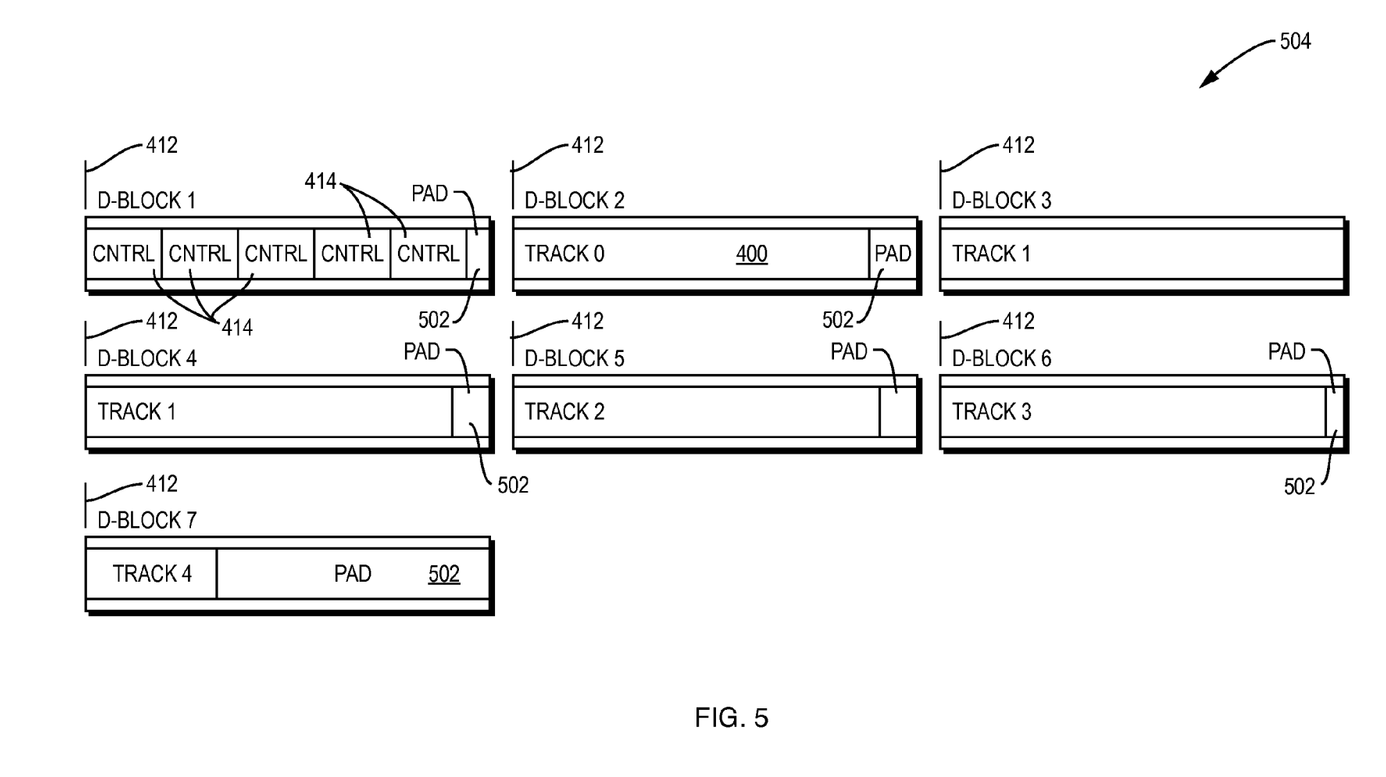
FIG. 5 is an example of how a de-dupe process will arrange data that is instead first subjected to an AMDD pre-process that rearranges the original backup data.
Figure 6:
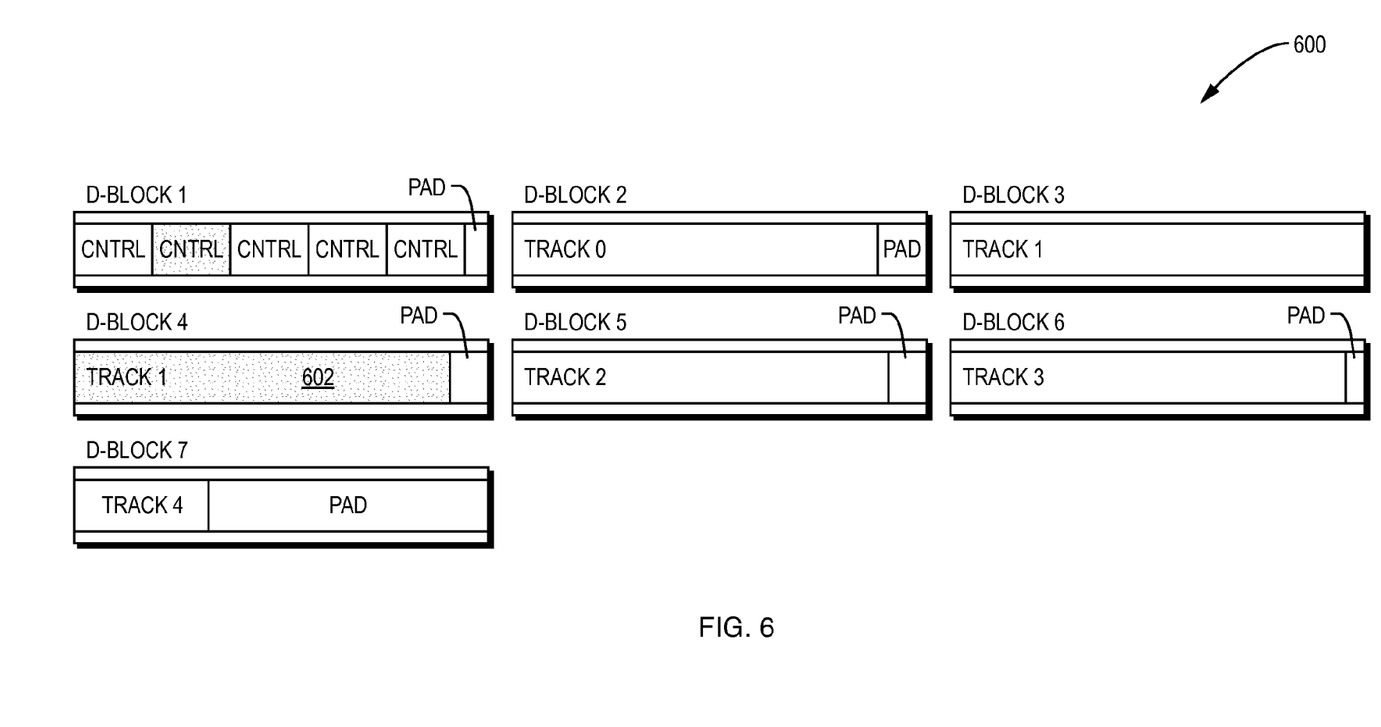
FIG. 6 illustrates a subsequent set of backup data that has changed slightly from the first set shown in FIG. 5.

For example, assume only data in Track 1 changes between two backups (e.g. 504, 600) of this data. Assuming none of the tracks were originally duplicates of each other, all of the blocks will be written to the back-end storage during the first backup.

During the second backup 600, however, the data sent to the de-dupe engine 214 looks like FIG. 6, where the grey areas show areas of change 602.

Figure 7:
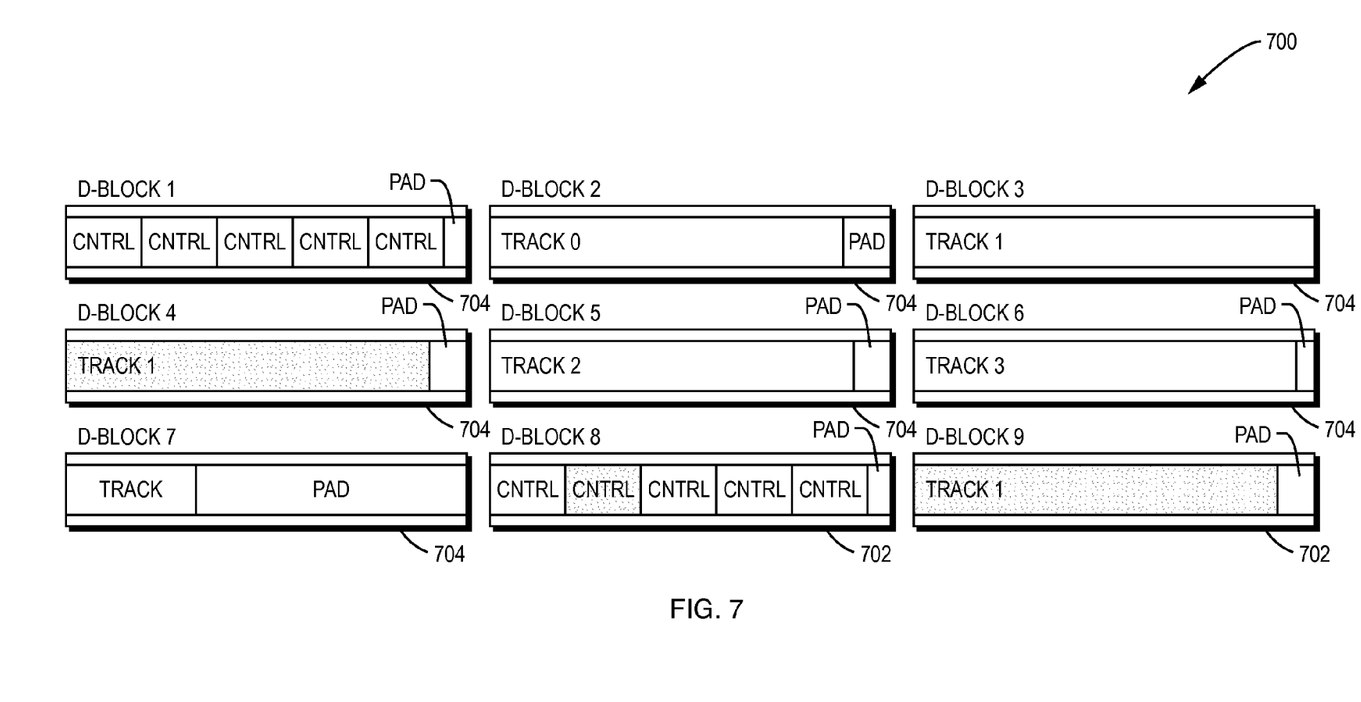
FIG. 7 shows the output of the de-dupe process, and that with an AMDD pre-process, only two additional blocks now need to be written to the back-end storage.

When the second backup 700 is processed by the de-dupe engine 214 only 2 additional blocks 702 will be added to the back-end storage 208 as shown in FIG. 7. All other blocks 704 will be duplicates of blocks stored during the first backup 600 and will not need to be saved.

Tape Blocking and Data Compression

Figure 8:
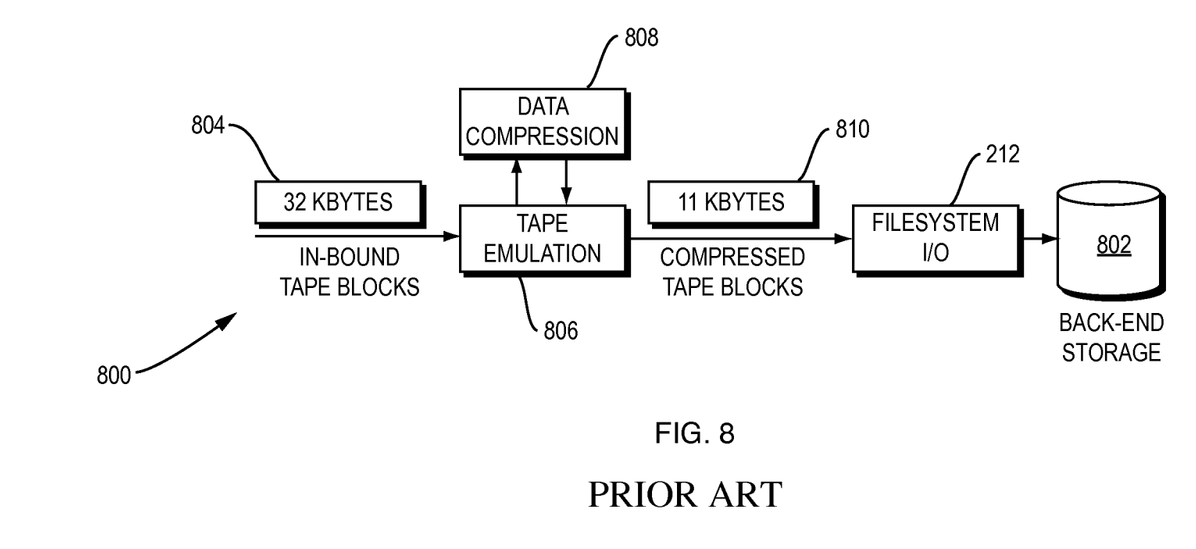
FIG. 8 is a high level diagram of a tape emulation process without AMDD.

When the mainframe writes a file 800 to a tape drive 802, the mainframe blocks the data 804. Typical block sizes are 32 k (kilobytes), 64 k, or 256 k. Without AMDD pre-processing, the tape emulation 806 receives a block of data 804 from the mainframe, compresses that block of data 804 using a hardware compression processor 808, and then writes the block 810 out to disk 802 as shown in the flow diagram of FIG. 8.

Figure 9:
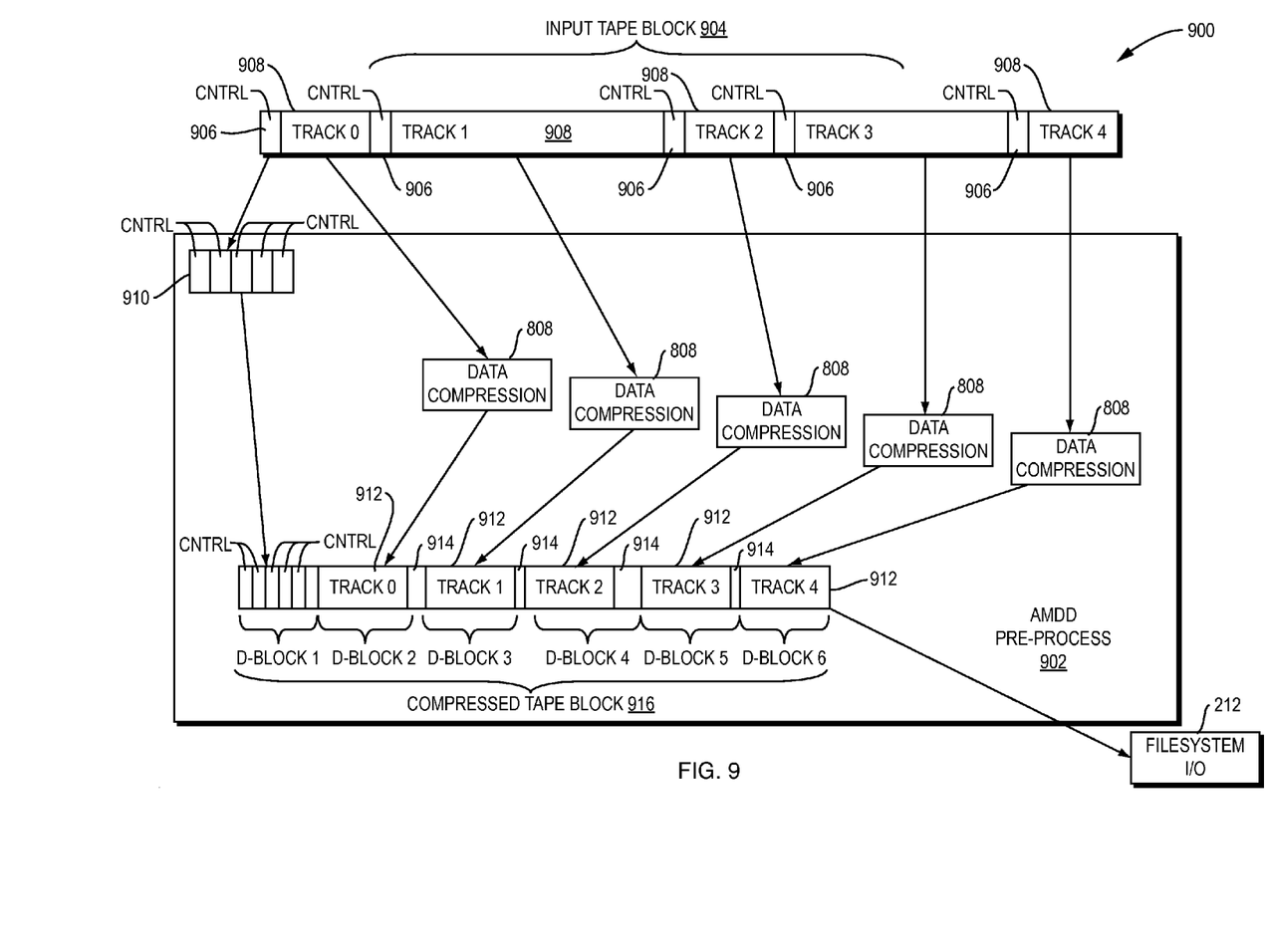
FIG. 9 illustrates how the AMDD pre-process handles tape blocks for selected de-dupe volumes.

Processing 900 of tape blocks for selected de-dupe volumes is completely handled by the AMDD pre-process 902 as shown in FIG. 9 and described as follows:

Blocks 904 received from the mainframe are forwarded by tape emulation 806 directly to the AMDD pre-process 902 without being compressed.

The AMDD pre-process 902 unblocks the data and separates the control information 906 from the track data 908.

Control information 906 is packed together 910 and then padded to the nearest de-dupe block size.

Each individual track 908 found in the tape block 904 is then sent to the data compression processor 808.

The compressed track 912 is then padded 914 to the nearest de-dupe block size.

Once all DASD tracks within the tape block have been compressed and padded as needed, the new, compressed tape block 916 is written to the file system 212.

The net result of this approach is that data de-duplication does not negate or eliminate the Mainframe Data Library hardware data compression. Tape volumes written to MDL will often realize data compression ratios of 3-to-1 or 4-to-1 without using AMDD or data de-duplication. When processed by the AMDD pre-process 902 and then forwarded to a de-dupe engine 214, these volumes should have already achieved a near 3-to-1 or 4-to-1 compression when compared to the data stream written from the mainframe.

Data de-duplication will then occur on these compressed volumes. The combined space savings will be significant.

An AMDD Example

Let's now consider a specific example. In this example, a 3390 Mod 9 volume is to be backed up by an IBM™ mainframe-based backup utility. Assume the volume is nearly full, so the backup of the 9 GB DASD volume results is a tape volume of 8.5 GBytes of data. The AMDD pre-process 210 uses hardware data compression 808 and conservatively compresses the volume by a factor of 3-to-1. The compressed tape volume sent to the back-end de-dupe engine is now approximately 2.8 GB in size. On the first backup, the open-systems de-dupe achieves a 2-to-1 compression, eliminating random duplicate blocks of data found in the tape volume's data stream. The amount of back-end storage consumed is now 1.4 GBytes. The overall reduction in disk usage for the single backup has been improved from a simple 3-to-1 hardware compression to 6-to-1 because of the de-dupe process.

Assume this is a daily backup of the mainframe's SYSRES volume. The daily backup is kept for 1 week. Assume that on any given backup no more than 2% of the data on the volume has changed. Each subsequent backup will add approximately 28 MB (megabytes) to the storage used to back up this volume. At the end of the 7th day, the total storage used by this volume will be 1.6 GBs. The total amount of data written by the mainframe was 59.5 GBs (8.5 GB times 7). If AMDD and de-dupe had not been used 3-to-1 hardware data compression would have stored the data using approximately 19.8 GBytes of space. Using AMDD and de-dupe resulted in an additional compression of 12.4 to 1 (19.8 GBs/1.6 GBs). The aggregate compression ratio for the 7 days was 37 to 1 (59.5 GB written/1.6 GB used).

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
a main data hardware processor, for providing a data stream;
a storage volume device emulator, connected to receive the data stream from the main data hardware processor, and from that data stream, produce a reformatted data stream arranged as a plurality of volume tracks for storage on a storage volume device;
an assisted data de-duplication processor configured to operate on the reformatted data stream prior to operation of a data de-duplicator, further configured to rearrange data in the reformatted data stream by identifying a start of volume track location, further configured to separate control information from other track data in the reformatted data stream, further configured to pack the control information together in the reformatted data stream, and further configured to add pad data to the reformatted data stream, including the packed control information, to align the start of the volume track location with a de-dupe data block location to produce a pre-processed data stream;
wherein the data de-duplicator is connected to receive the pre-processed data stream and remove duplicate portions thereof to produce a set of de-duplicated data blocks for storage on a mass storage filesystem.

2. The system of claim 1 wherein the volume tracks are Direct Access Storage Data (DASD) tape volumes.

3. The system of claim 1 wherein the control information indicates block counts of its corresponding track data.

4. The system of claim 1 wherein the assisted data de-duplication processor further identifies an application that originated the data stream, and selectively operates on the data stream depending on whether the application is a data backup application.

5. An apparatus comprising:
a data hardware processor connected to receive a received data stream and produce a stream of pre-processed data blocks for subsequent data de-duplication, the pre-processed data blocks having starting locations, the received data stream having volume tracks therein;
the data hardware processor scanning the received data stream to identify a starting location of one of the plurality of volume tracks, separating control information from other track data in the reformatted data stream, packing the control information together in the reformatted data stream, and adding pad data to the reformatted data stream including the packed control information, to align the starting location of the one volume track with a starting location of the pre-processed data blocks to produce the stream of the pre-processed data blocks.

6. The apparatus of claim 5 further comprising:
a data stream controller receiving the stream of pre-processed data blocks to produce a stream of de-duplicated data blocks for storage on a mass storage filesystem,
the data stream controller identifying an original copy of the one volume track and at least one repetitive copy of the original copy within the stream of pre-processed data blocks,
the data stream controller replacing the repetitive copy with a pointer addressing to the original copy,
the data stream controller storing the original copy and the pointer as a stored stream of duplicated data blocks on a mass storage filesystem.

7. The apparatus of claim 6 wherein the data stream controller is a Mainframe Data Library (MDL).

8. The apparatus of claim 6 wherein control information indicates block counts of its corresponding track data.

9. The apparatus of claim 8 wherein the data hardware processor further compresses the volume tracks and then pads the compressed volume tracks to result in a set of contiguous compressed data equal to a size of the de-duplicated data blocks.

10. The apparatus of claim 5 wherein the received data stream is from Direct Access Storage Data (DASD) tape volumes.

11. The apparatus of claim 5 wherein the data hardware processor further identifies an application that originated the received data stream, and selectively operates on the received data stream depending on whether the application is a data backup application.

12. A method comprising:
receiving a data stream having at least two volume tracks therein, the volume tracks having starting locations;
scanning the data stream to identify the starting locations of the volume tracks; and
rearranging the data stream to provide a stream of pre-processed data blocks to a de-duplication engine, the stream of pre-processed data blocks having data blocks therein, the data blocks having starting locations, the data stream rearranged by separating control information from other track data in the reformatted data stream, packing the control information together in the reformatted data stream, adding pad data to the reformatted data stream, including the packed control information, to align the starting locations of the volume tracks to the starting locations of the data blocks.

13. The method of claim 12 further comprising:
receiving the stream of pre-processed data blocks having an original copy of at least one of the data blocks and a repetitive copy of the original copy therein;
identifying the original copy of the data block and at least one repetitive copy of the original copy;
replacing the repetitive copy with a pointer addressing to the original copy; and
storing the original copy and the pointer as a stored stream of de-duplicated data blocks on a mass storage filesystem.

14. The method of claim 13 wherein a Mainframe Data Library (MDL) identifies the original copy and the repetitive copy of the original copy within the stream of pre-processed data blocks; and replaces the repetitive copy with the pointer addressing to the original copy.

15. The method of claim 14 wherein the control information indicates block counts of its corresponding track data.

16. The method of claim 15 further comprising:
compressing the volume tracks; and
padding the compressed volume tracks to result in a set of contiguous compressed data equal to a size of the de-duplicated data blocks.

17. A non-transitory computer readable storage medium having computer readable program code embodied therein for de-duplicating data, the computer readable medium program code performing functions comprising:
receiving a data stream having at least two tape volume tracks therein, the tape volume tracks having starting locations;
scanning the data stream to identify the starting locations of the tape volume tracks; and
rearranging the data stream to provide a stream of pre-processed data blocks to a de-duplication engine;
separating control information from other track data in the reformatted data stream;
packing the control information together in the reformatted data stream;
wherein the stream of pre-processed data blocks have data blocks therein, the data blocks having starting locations, and the data stream is rearranged by adding pad data to align the starting locations of the tape volume tracks to the starting locations of the data blocks.

18. The non-transitory computer readable medium of claim 17, wherein the computer readable medium program code further performs functions comprising:
receiving the stream of pre-processed data blocks having an original copy of at least one of the data blocks and a repetitive copy of the original copy therein;
identifying the original copy of the data block and at least one repetitive copy of the original copy;
replacing the repetitive copy with a pointer addressing to the original copy; and
storing the original copy and the pointer as a stored stream of de-duplicated data blocks on a mass storage filesystem.

* * * * *